United States Patent [19]

Smith

[11] 4,009,889

[45] Mar. 1, 1977

[54] TRAILER COUPLING

[76] Inventor: Marjorieann M. Smith, 3825 Valley, Sp. 56, Walnut, Calif. 91789

[22] Filed: June 16, 1975

[21] Appl. No.: 587,159

[52] U.S. Cl. .................... 280/423 R; 280/106 T; 280/495

[51] Int. Cl.² .................... B62D 63/06; B60D 1/00

[58] Field of Search .......... 280/423 R, 400, 106 T, 280/495, 414 R, 204, 2, 24, 34 A, 656

[56] References Cited
UNITED STATES PATENTS 1,857,784  5/1932  Kuester ........................... 280/2 X
3,797,850  3/1974  Stout et al. ...................... 280/495 X

*Primary Examiner*—Joseph F. Peters, Jr.
*Assistant Examiner*—Milton L. Smith
*Attorney, Agent, or Firm*—Boniard I. Brown

[57] ABSTRACT

A trailer having a relatively low-slung flat frame bed supported on wheels and an elevated front coupling member joined by connecting means of unique construction to a front hitch tongue on the frame bed for rotatable connection to a trailer hitch coupling ball on a towing vehicle.

6 Claims, 7 Drawing Figures

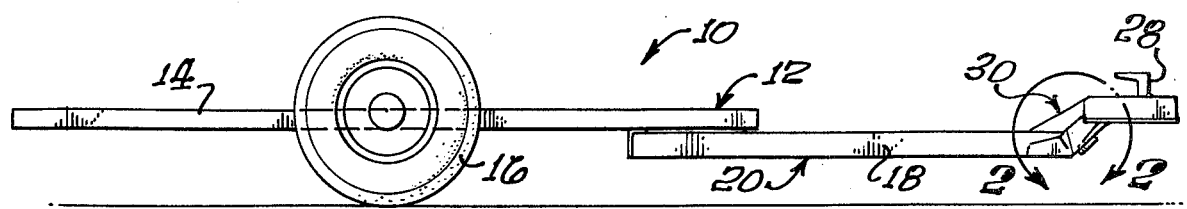
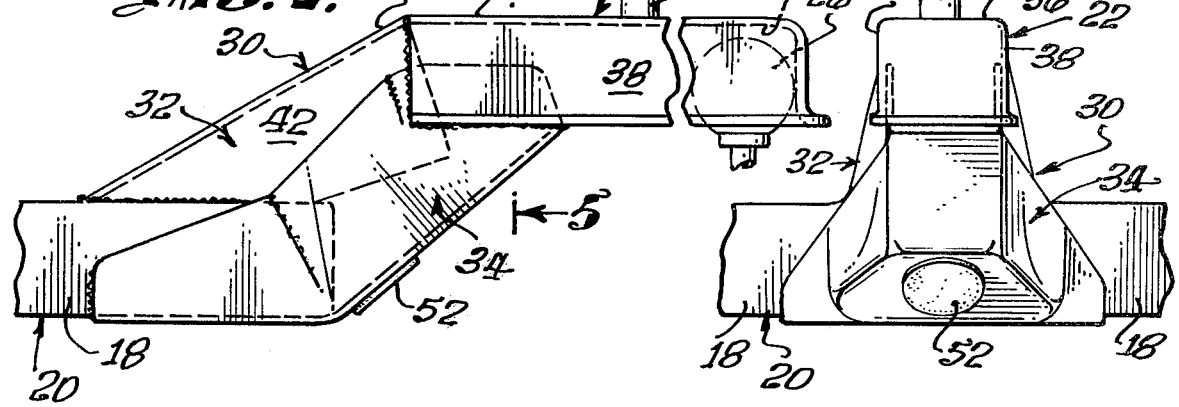
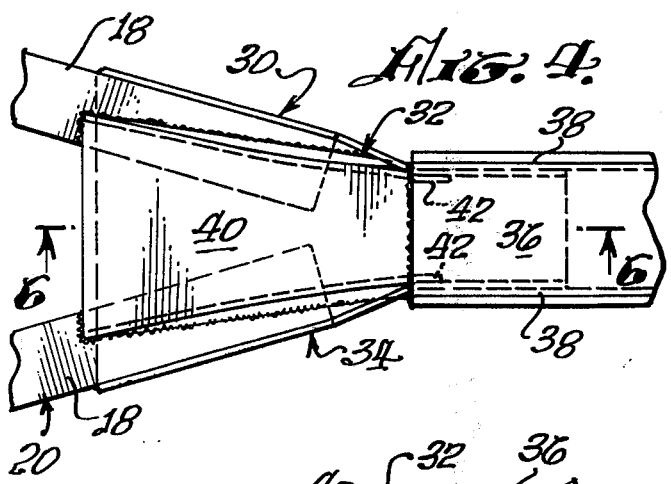
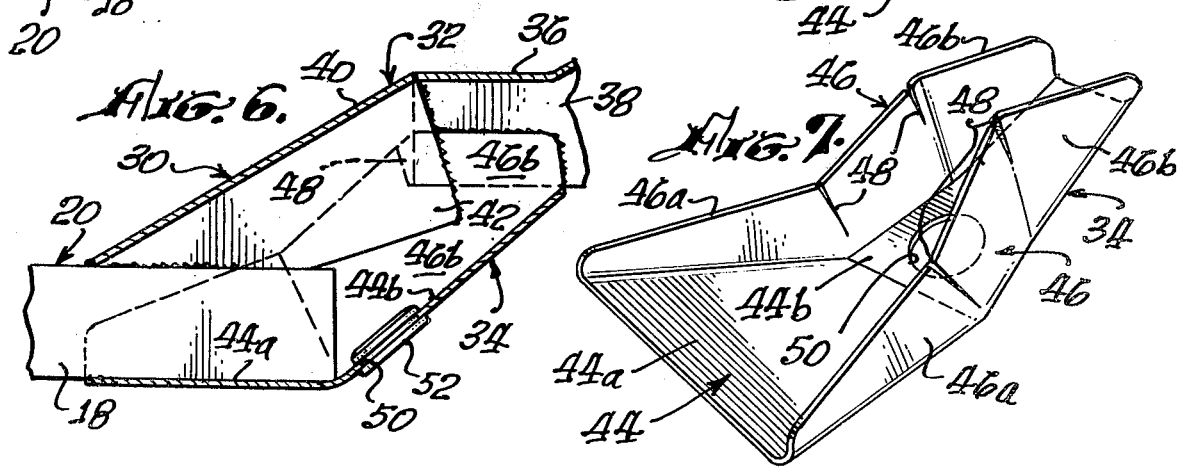

TRAILER COUPLING

BACKGROUND OF THE INVENTION

1. Field of the Invention

This invention relates generally to trailers and more particularly to improvements in trailers of the kind having a low-slung frame and adapted for connection by a ball and socket coupling to a towing vehicle.

2. Prior Art

The most common form of trailer hitch utilizes a ball and socket coupling including a coupling ball on the towing vehicle and a coupling member on the trailer containing a coupling socket for rotatably receiving the coupling ball. The coupling member includes means for releasibly locking the ball in the socket so as to prevent accidental disengagement of the ball from the socket.

This type of trailer hitch presents a problem of fabrication in connection with trailers having a relatively low-slung construction, such as trailers for hauling automotive vehicles, motorcycles and the like. Thus, in this type of trailer, the trailer frame bed, which supports the vehicle being hauled, is preferably located as close to the ground as possible in order to maintain as low as possible the combined center of gravity of the trailer and vehicle and to facilitate movement of vehicles into and from the trailer. The coupling member of the trailer, on the other hand, must be located at the proper elevation to engage the coupling ball on the towing vehicle and, in low-slung trailers of the kind referred to, must be located above the level of the frame bed. As a consequence, fabrication of such a low-slung trailer presents the problem of rigidly joining the elevated coupling member to the trailer frame.

SUMMARY OF THE INVENTION

This invention provides a low-slung trailer construction of the character described wherein the elevated coupling member of the trailer is joined to the trailer frame, and more specifically to front converging tongue members of the frame, in a unique manner which simplifies the trailer fabrication and eliminates the problems associated with the existing methods of providing an elevated trailer hitch coupling in underslung trailers.

According to the invention, the elevated coupling member is joined to the trailer frame tongue members by separately fabricated connecting means having upper and lower ends which are welded or otherwise rigidly joined to the coupling member and the tongue members, respectively. The preferred connecting means comprise a pair of U-section channels which extend upwardly and forwardly from the front ends of the trailer frame tongue members to the rear end of the trailer coupling member with the channels arranged one over the other with their open sides facing one another. The lower ends of the channels straddle and are rigidly secured to the upper and lower sides of the tongue members. The upper ends of the channels are rigidly secured to the coupling member, which has a downwardly opening U-section channel configuration.

An important feature of the invention relates to the unique configurations of these connecting channels whereby the latter are adapted to provide a rigid connection between the frame tongue members and the coupling member. According to this feature, the lower ends of the upper channel flanges are beveled to seat flat against and are firmly joined to the upper sides of the tongue members. The lower end of the lower channel web is bent at an oblique angle to the upper portion of the web to seat against the undersides of the tongue members and the lower ends of the lower channel flanges are flared to straddle and engage the laterally outer sides of the tongue members, and these lower web and flange ends are rigidly joined to the tongue members. The upper ends of the channel flanges into the space between the flanges of the channel section coupling member and are disposed and rigidly joined in overlapping face-to-face contacting relation with one another and with the coupling member flanges.

BRIEF DESCRIPTION OF THE DRAWINGS

FIG. 1 is a side elevation of a trailer embodying the invention;

FIG. 2 is an enlargement of the area encircled by the arrow 2—2 in FIG. 1;

FIG. 3 is a front end view of the structure shown in FIG. 2;

FIG. 4 is a top view of the structure in FIG. 2;

FIG. 5 is an enlarged section taken on line 5—5 in FIG. 2;

FIG. 6 is a section taken on line 6—6 in FIG. 4; and

FIG. 7 is an enlarged perspective view of the member of the structure shown in FIGS. 2-6.

DESCRIPTION OF THE PREFERRED EMBODIMENT

Referring first to FIG. 1 of the drawings, the illustrated trailer 10 has a low-slung construction and may be a trailer for transporting automotive vehicles, motorcycles or the like. The trailer has a generally flat frame 12 including a rear frame bed 14 mounting wheels 16 and front frame members 18 rigidly joined to the bed and extending forwardly in converging relation to form a hitch tongue 20. Located forwardly of and above the front ends of the frame tongue members 18 is an elevated coupling member 22 containing a socket 24 for receiving the coupling ball 26 of trailer hitch on a towing vehicle (not shown) to provide a ball and socket coupling between the vehicle and trailer. The coupling member includes means 28 for releasibly locking the ball in the socket to prevent accidental separation of the ball from the socket. The coupling member 22 is rigidly joined to the front ends of the trailer tongue members 18 by connecting means 30 according to this invention. This connecting means is uniquely constructed to provide a relatively simple and yet rigid connection between the tongue members and the elevated coupling member, thus permitting the coupling member to be located at the proper elevation above the low-slung trailer frame 12 for engagement with the coupling ball 26 of the towing vehicle trailer hitch.

Connecting means 30 comprises a load transmitting structure which is fabricated separately from the trailer tongue members 18 and the coupling member 22 and has its ends welded or otherwise rigidly joined to these members. The particular and preferred connecting means shown comprises a pair of upper and lower U-section channels 32, 34 arranged with their open sides facing one another. The lower ends of these channels straddle the upper and lower sides of and are rigidly joined to the tongue members at the front ends of these members. The upper ends of the channels are disposed in interfitting relation and rigidly joined to the coupling member.

Referring now to FIGS. 2–7, the coupling member 22 will be seen to have a generally U-section channel configuration including an upper web 36 and depending flanges 38 along the longitudinal edges of the web. The front end of the coupling member is internally configured to form the coupling socket 24. The rear end of the member is open.

The connecting channels 32, 34 extend upwardly and forwardly from the front ends of the trailer tongue members 18 to the rear end of the coupling member 22. The upper channel 32 has an upper web 40 of generally trapezoidal shape with a relatively wide lower end which spans the front ends of the tongue members and a relatively narrow upper end whose width is slightly less than the spacing between the coupling member flanges 38. Along the tapered edges of the web 40 are depending flanges 42. The lower ends of the channel flanges 42 are beveled, as shown, to seat flat against the upper surfaces of the trailer tongue members 18 and are welded to these surfaces. The upper end of the upper channel web 40 seats against and is welded to the rear edge of the coupling member web 36. The upper corners of the upper channel flanges 42 project through the rear open end of the coupling member 22 in spaced relation to its flanges 38.

The lower connecting channel 34 has a lower web 44 and upstanding flanges 46 along the longitudinal edges of the web. The lower end portion 44a of the web 44 is bent at an oblique angle relative to the upper web portion 44b to seat flat against the undersides of the front ends of the trailer tongue members 18 and has a generally trapezoidal shape which is so sized that its edges are substantially flush with the laterally outer sides of the tongue members. The lower channel flange portions 46a along the edges of the lower web portion 44a straddle and seat against these laterally outer sides of the tongue members. The lower channel web and flange portions 44a, 46a are welded to the tongue members, as shown.

The upper portion 44b of the lower connecting channel web 44 is tapered for a portion of its length from its juncture with the lower web portion 44a and then continues in an upper end section having a uniform width approximating the spacing between the coupling member flanges 38. The lower channel flanges 46 are slit at 48 to facilitate bending of the flanges into conformance with the non-linear edges of the web, as shown. The upper, generally parallel flange portions 46b of the lower channel along the edges of its upper generally uniform width portion project upwardly into the interior of the coupling member 22 between and into face to face contact with the coupling member flanges 38 and the upper channel flanges 42, as may be best observed in FIG. 5. These contacting flanges and the lower channel flange slits 48 are welded, as shown, to complete the rigid connecting 30 between the trailer tongue members 18 and the coupling member 22.

Preferably, the web 44 of the lower connecting channel 34 is formed with a drainage hole 50 closed by a removable plug 52 which may be removed to drain water from the lower channel.

The inventor claims:

1. A trailer to be towed by a vehicle having a rear trailer hitch including a coupling ball, comprising:
   a generally flat frame including a relatively low-slung bed and front converging tongue members forming a hitch tongue at the front end of said bed,
   a coupling member located above and forwardly of the front ends of said tongue members and having a socket for rotatably receiving said coupling ball,
   connecting means fabricating separately from and extending between said tongue members and coupling member and having upper and lower ends rigidly joined to said coupling member and tongue member ends, respectively,
   said connecting means comprising a pair of upper and lower generally U-section channels having side flanges and arranged with their open sides facing one another, their lower ends straddling the upper and lower sides of said tongue member ends and their flanges disposed in overlapping face to face contacting relation, means joining said overlapping flanges to one another, means rigidly securing said lower channel ends to said front tongue member ends, and means rigidly securing the upper channel ends to said coupling member, and
   wheels mounted on said frame bed along the sides of the bed.

2. A trailer according to claim 1 wherein:
   the lower ends of the upper channel flanges are beveled to seat against and are secured to the upper sides of said front tongue member ends,
   the lower end of the lower channel web seats against and is secured to the undersides of said front tongue member ends, and
   the lower ends of the lower channel flanges are flared to straddle and are secured to the laterally facing sides of said front tongue member ends.

3. A trailer according to claim 2 wherein:
   said coupling member has a generally U-shaped channel cross-section and includes an upper web and depending flanges along the edges of the latter web, and
   the upper ends of the flanges of said upper and lower channels are disposed in overlapping face-to-face contacting relation with one another and with the flanges of said coupling member and the contacting flanges are secured to one another.

4. A trailer according to claim 3 wherein:
   the upper flange ends of said lower channel straddle the upper flange ends of said upper channel and fit between the flanges of said coupling member.

5. A trailer according to claim 1 wherein:
   said coupling member has a generally U-shaped channel cross-section and includes an upper web and depending flanges along the edges of the latter web, and
   the upper ends of the flanges of said upper and lower channels are disposed in overlapping face-to-face contacting relation with one another and with the flanges of said coupling member and the contacting flanges are secured to one another.

6. A trailer according to claim 5 wherein:
   the upper flange ends of said lower channel straddle the upper flange ends of said upper channel and fit between the flanges of said coupling member.

* * * * *